No. 873,992. PATENTED DEC. 17, 1907.
W. R. CUNNINGHAM.
UNLOADING MECHANISM.
APPLICATION FILED SEPT. 18, 1907.

2 SHEETS—SHEET 1.

Witnesses
J. T. Walker
A. B. Ernst.

Inventor
William R. Cunningham
By T. Walter Fowler
his Attorney

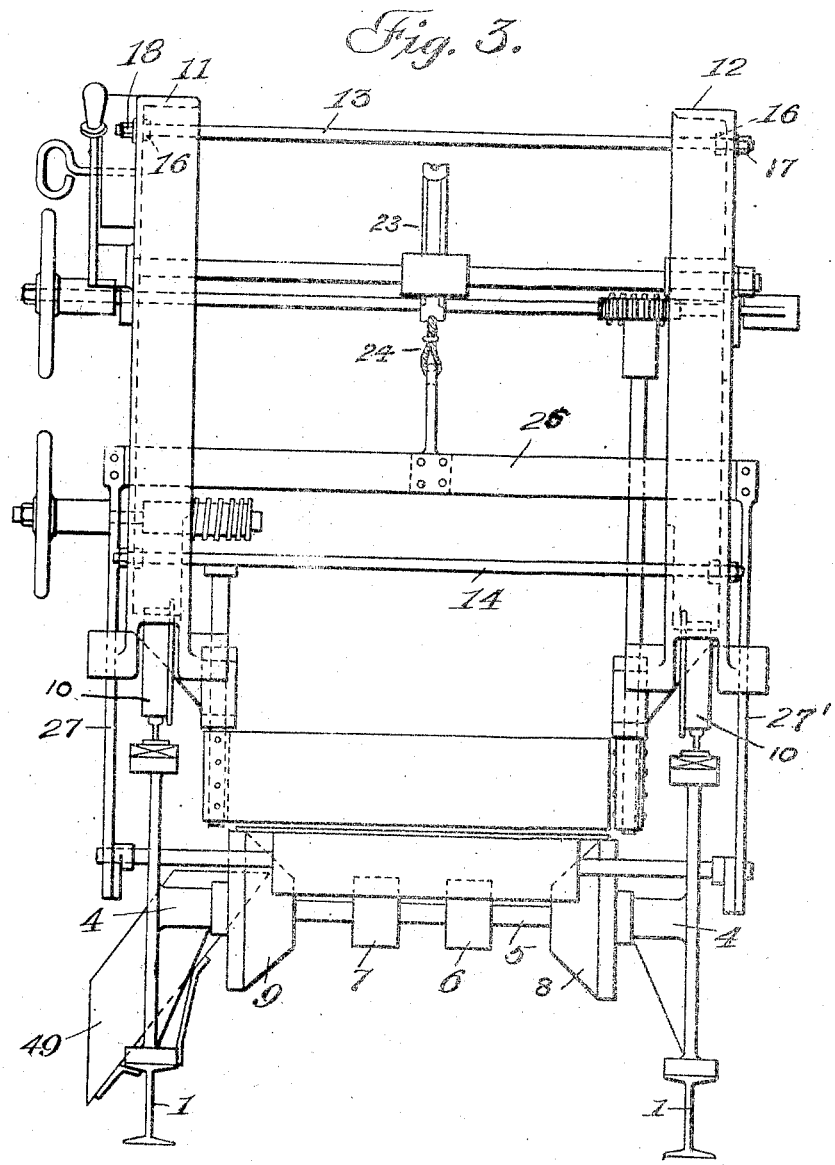

UNITED STATES PATENT OFFICE.

WILLIAM R. CUNNINGHAM, OF BUCYRUS, OHIO, ASSIGNOR TO THE AMERICAN CLAY MACHINERY COMPANY, OF BUCYRUS, OHIO, A CORPORATION.

UNLOADING MECHANISM.

No. 873,582.

Specification of Letters Patent.

Patented Dec. 17, 1907.

Application filed September 18, 1907. Serial No. 393,478.

*To all whom it may concern:*

Be it known that I, WILLIAM R. CUNNINGHAM, a citizen of the United States, residing at Bucyrus, in the county of Crawford and State of Ohio, have invented new and useful Improvements in Unloading Mechanism, of which the following is a specification.

This invention relates to certain new and useful improvements in unloading mechanism wherein means are employed for removing loose material carried by a belt-conveyer, and delivering said material to either or both sides of the conveyer.

Primarily my invention is designed for handling wheat, corn, clay, coal and other like loose material from a traveling belt-conveyer at any intermediate point in the length thereof, and to remove part of the material on one side and part on the other, or all on either side, as desired, such device being technically known in this art as a "tripping device".

The invention consists of the parts and the construction, arrangements and combinations of parts which I will hereinafter describe and claim.

Figure 1:
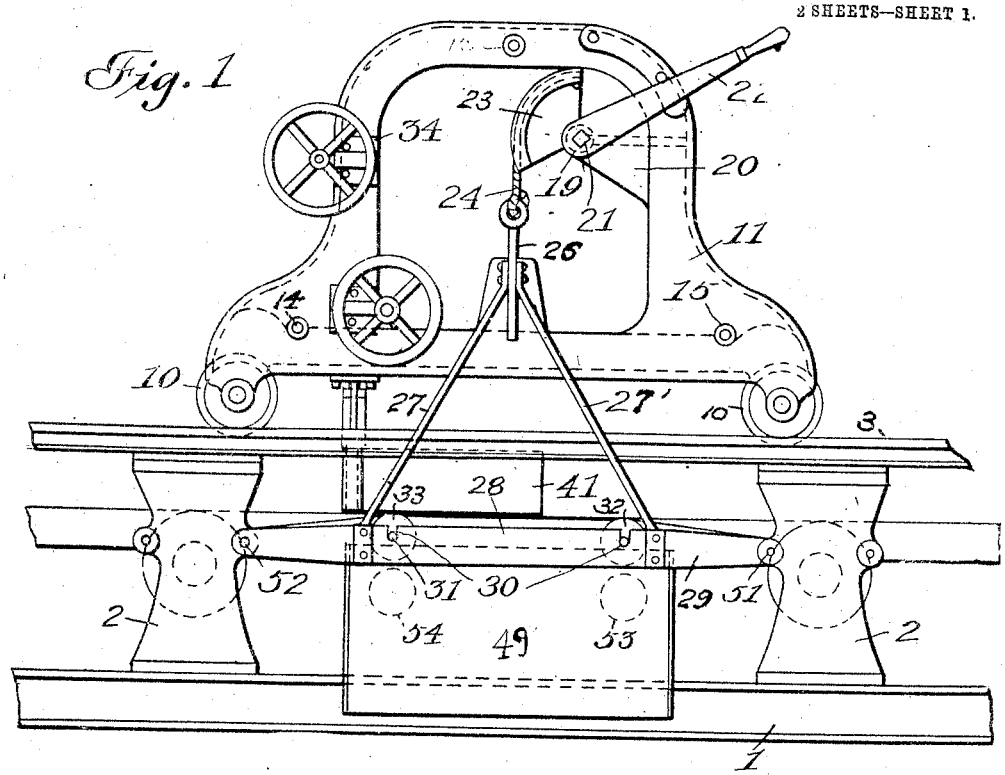
Figure 2:
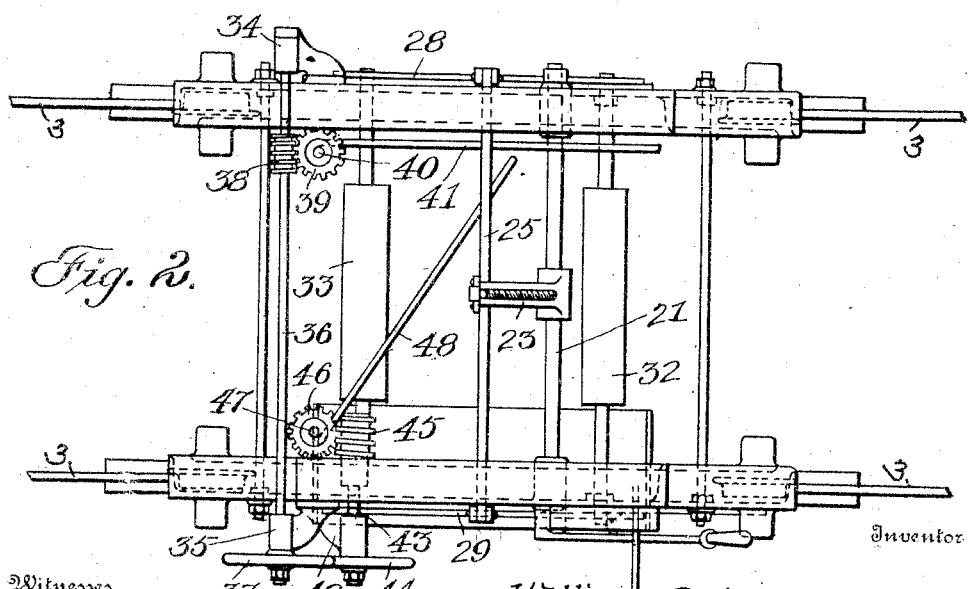

In the accompanying drawings forming part of this specification and in which similar reference characters indicate like parts in the several views, Figure 1 is a side illustration of an unloading mechanism embodying my invention. Fig. 2 is a top plan view of Fig. 1. Fig. 3 is an end elevation.

In carrying out my invention I employ an appropriate frame work or support wherein I-beams, 1, or like parts form the main members and to which are bolted or otherwise secured the lower ends of the uprights, 2, which in practice are spaced apart from one end of the conveyer to the other. The upper ends of the uprights support an elevated track composed of the rails, 3, upon which my unloading device is mounted and over which it travels or may be moved from point to point along the belt conveyer, said track being arranged substantially parallel with the conveyer and above the same, as shown in Fig. 1. This conveyer may represent any of the usual and well known forms used for conveying such material as before mentioned. For purposes of simplicity the conveyer may be a common belt of canvas, leather, or other appropriate material of suitable width and of such length as may be required, said belt being adapted to travel over and be supported on rollers or pulleys, 6 and 7, fixed to shafts, 5, whose ends are journaled in bearings, 4, on one side of the uprights, 2. Loose on the shafts, 5, outside of the pulleys, 6, are cone-pulleys, 8 and 9, and upon these cone-pulleys and the plain pulleys, 6 and 7, the conveyer-belt runs with its edges engaged by the cone-surface of the pulleys, 8 and 9, whereby the said edges are curved upwardly to give substantially a trough-shape to the belt for holding or confining the material on the belt while it is being conveyed from one point to another.

Upon the track, 3, before mentioned, a wheeled or movable carriage having my unloading devices is designed to travel and to be fixedly secured, when desired, as when unloading the material from the belt, said carriage comprising suitable side frames, 11 and 12, with rollers, 10, at the lower corners engaging the track rails. Distance pieces 13, 14 and 15, serve to hold the side frames at a suitable distance apart, said distance pieces being herein shown as consisting of rods with collars, 16, adapted to form shoulders for the side frames to rest against, said collars being secured to the rods by nuts, 17 and 18. Other equally appropriate and well known means may be used for holding the side frames rigidly apart without departing from the spirit of my invention.

The side frames are preferably constructed with a web, 20, or other means having a bearing, 19, in which is journaled a horizontal transverse shaft, 21, to one end or some other part of which is secured a lever, 22, said shaft having fixed to its intermediate portion a segment or curved arm, 23. One end of a cable, 24, or other connection is fixed to the segment or arm, 23, said cable thence passing over the segment or arm to a point below the same and having its lower end attached to the central portion of a longitudinal bar, 26, which extends transversely across the carriage and through the open centers of the side frames, 11 and 12.

At each end of the bar, outside of the side frames, are bolted or otherwise secured suitable hangers, 27 and 27' at the lower end of which are two bars, 28 and 29, of sufficient length to extend between adjacent uprights, 2, said uprights being formed or provided with holes, 51, and the ends of the bars, 28 and 29, having holes, 52, adapted to register with the other holes, 51, and to receive pins for the purpose of locking the movable carriage to the fixed supporting frame-work, as I will hereinafter describe.

The bars, 28 and 29, have their upper edges provided with open bearings, 30, adapted to receive the gudgeons or journal ends of suitable rollers, 32 and 33, the purpose of which is to cause the belt to change its transverse form from the normal trough-shape before mentioned, to a level or flat surface, at the point of delivery of the material being transported.

Bolted to the upper portions of the side frames, at one end of the carriage, are journal bearings, 34 and 35, which support a transverse shaft, 36, on one end of which is fixed a hand wheel, 37, or other operating means, while on the opposite end portion is a worm, 38, which meshes with a worm-wheel, 39, fixed to the upper end of a vertical shaft, 40, to whose lower end is fixed a wing-scraper or blade, 41, adapted to direct the material on the belt outwardly towards and over one edge of the conveying-belt, and into a suitable chute or apron, 49, as shown in Figs. 1 and 3.

To one of the side frames and on the opposite side of the main frame from the vertical shaft, 40, is bolted another journal bearing, 42, which supports a horizontal transversely extending worm shaft, 43, carrying a handwheel, 44, and worm, 45, arranged to engage a worm-gear, 46, on the upper end of a vertical shaft, 47, to the lower end of which is attached a wing-scraper, 48, said shafts, 40 and 47, being mounted in suitable bearings secured to the side frames.

The chute or apron, 49, before mentioned is designed to be removably attached to the fixed beams or rails, 1, which support the uprights, 2, so that it may be shifted from one position to another thereon, and be used on either side of the unloading devices.

The operation of the foregoing parts may be generally stated as follows: The material to be conveyed, whatever the character of said material, is received upon the belt-conveyer, 50, and carried to any desirable point to be unloaded, where the improved tripping device heretofore mentioned is located. If it is desired to unload all of the material on one side of the belt, a wing scraper, 48, is thrown into the position shown in Fig. 2 whereby this scraper directs the material towards the side of the belt and delivers it into the chute, 49, on that side of the apparatus. That said material may be delivered as described, the bars, 28, with their rollers, 32 and 33, are raised by the proper manipulation or downward movement of the hand lever, 22, which rocks the arm or segment, 23, which through the medium of the connection, 24, and hangers, 27 and 27', elevate the rollers and their supporting bars from the dotted position, 53, in Fig. 1, to the full-line position in said figure. This action causes the belt to be lifted off the cone pulleys, 8 and 9, and further causes said belt to assume a level or flat position transversely, thereby making the action of the scraper positive and satisfactory. If it is desirable to remove a part of the material on one side, the wing scraper, 48, is set so that the outer end will extend to the center line of the belt. The worm gear, hand wheel, and worm, afford satisfactory means for setting the scraper at any position desired. If half of the material is to be delivered on one side of the conveyer belt and half on the other side, then the scrapers, 41 and 48, are positioned so that their ends will join in the center of the belt. When I desire to deliver all the material to the side of the belt opposite to that first above described, the removable chute or apron, 49, is removed and placed in position on the side to which the material is to be delivered, and the scraper, 48, will be shifted to the side similar to that shown by the position occupied by the scraper, 41, in Fig. 2, and the said scraper, 41, will be shifted to an angle the reverse of that shown by the other scraper, 48, so that it will extend substantially across the path of the material being conveyed and will cause this material to be scraped toward the opposite side from what the scraper, 48, would deliver it when in the position shown in Fig. 2. When the carriage or tripping device is to be shifted from one position along the belt to another, the rollers, 32 and 33, are lifted out of their open bearings to permit the carriage to travel to a new position lengthwise of the conveyer. When said carriage reaches the point desired, the pins are inserted in the holes, 51 and 52, in the bars 28 and 29, and uprights, 2, thereby fixing the carriage to a stationary portion of the structure. The rollers, 32 and 33, may now be placed in position in the bars, 28 and 29, and elevated, as before described, into the full-line position of Fig. 1. Whenever it is desirable to permit the conveyed material to pass to the discharge end of the conveyer-belt, 50, the frame formed by the bars, 28 and 29, with its rollers are lowered to the position shown by dotted lines, 53 and 54, which allows the belt to drop upon the cone-shaped pulleys, 8 and 9, and thus assume its normal curved or trough shape.

The mechanism described is simple in its construction, positive in its action and forms a convenient and satisfactory means for removing loose material at any point in the length of the conveyer belt while said belt is in operation; a part of the material may be delivered on one side of the belt and a part on the other side, or all the material may be delivered on either side, or the material may be allowed to pass the tripping devices to the end of the conveyer belt, as circumstances may make desirable.

Having thus described my invention what

I claim as new and desire to secure by Letters Patent is:

1. In an unloading mechanism, the combination with a belt conveyer and means for imparting thereto substantially a curved trough-shape in cross-section, of a horizontally-movable scraper positioned above the belt, means for changing the angle of the scraper relative to the surface of the belt over which said scraper operates, and means for elevating said belt relative to the scraper and coördinately changing the cross-sectional form of the belt to substantially a flat or level surface.

2. In an unloading mechanism, the combination with a belt-conveyer and a support therefor, said support having means for uplifting the edges to thereby give the belt substantially a curved shape in cross-section, of means for raising the belt out of engagement with said edge-uplifting means, and changing the cross-sectional form of the belt to substantially a plane or level surface, and a scraper interposable in the range of action of the belt and adapted to direct said material laterally over the edge of the belt, said scraper being pivotally mounted at one portion and adapted to have an adjustment relative to the belt in a plane transversely of the travel thereof.

3. In an unloading mechanism, the combination with a belt-conveyer and supporting means therefor having members for normally uplifting the edges of the belt to cause the material to be retained on the belt, of a scraper positioned relative to the belt and adapted to be moved in a horizontal plane more or less diagonally across the carrying surface thereof, and means for elevating the carrying-portion of the belt into the range of action of the scraper and out of support of the edge-uplifting means, whereby the carrying surface of the belt is changed to a flat or level surface for the scraper to operate over.

4. In an unloading mechanism, the combination with a belt-conveyer and supporting means therefor having members for normally uplifting the edges of the belt to cause the material to be retained on the belt, of a scraper positioned relative to the belt and adapted to be moved in a horizontal plane more or less diagonally across the carrying surface thereof, and means for elevating the carrying portion of the belt into the range of action of the scraper and out of support of the edge-uplifting means, whereby the carrying surface of the belt is changed to a flat or level surface for the scraper to operate over, and a carriage movably mounted and shiftable from one position to another in the length of the belt, said belt-elevating means and scraper being mounted on said carriage.

5. In an unloading mechanism, the combination with a belt-conveyer and a roller support therefor, of a guide fixed above the belt, a carriage movable over said guide to different points in the length of the belt, a scraper mounted on the carriage so as to have a swinging movement in a plane at right angles to the travel of the belt, and means for elevating the conveying-run of the belt into the range of action of the scraper and for straightening the portion of the belt passing under the scraper.

6. In an unloading mechanism, the combination with a belt-conveyer, and a guide and support therefor, of a track above and substantially parallel with the belt, a carriage movably-mounted on said track, scrapers at opposite sides of the carriage and turnably-mounted therein to stand parallel with the direction of movement of the belt, or at an angle thereto, a roller-carrying frame normally positioned below and out of the range of action of the belt, means for suspending the roller-carrying frame from the carriage, means for elevating the roller-carrying frame to cause it to elevate the conveying-run of the belt, and straighten the same out transversely, and wing-scrapers attached to the carriage and turnable in a plane transverse of the belt and adapted to deliver the material to either or both sides of the belt.

7. In an unloading mechanism, the combination with a belt-conveyer and a guide and support therefor, of a track above and substantially parallel with the belt, a carriage movably-mounted on said track, scrapers at opposite sides of the carriage and turnably-mounted therein to stand parallel with the direction of movement of the belt, or at an angle thereto, a roller-carrying frame normally positioned below and out of the range of action of the belt, means for suspending the roller-carrying frame from the carriage, means for elevating the roller-carrying frame to cause it to elevate the conveying-run of the belt and straighten the same out transversely, and wing-scrapers attached to the carriage and turnable in a plane transverse of the belt and adapted to deliver the material to either or both sides of the belt, said frame-elevating means comprising a rock-shaft, a curved-face arm or segment fixed thereto, and hangers suspended from the arm or segment and fixed to the said roller-carrying frame.

8. An unloading mechanism comprising a belt-conveyer and a supporting frame-work, said frame-work having rollers and certain of said rollers being cone-shaped and adapted to uplift the edges of the belt and give to the belt a curved form in cross section; a guide above the belt, and a carriage movably-mounted on said guide; scrapers on the carriage at opposite sides of the belt and turnable from a position parallel with the travel of the belt to a position at an angle thereto; and a frame suspended from the carriage having rollers passing beneath the upper run of the belt, said rollers being normally below and out of contact with the belt and adapted to lift the belt from its roller-support and straighten out transversely the portion of the belt beneath the scrapers.

9. An unloading mechanism comprising a belt-conveyer and a supporting frame-work, said frame-work having rollers and certain of said rollers being cone-shaped and adapted to uplift the edges of the belt and give to the belt a curved form in cross-section; a guide above the belt, and a carriage movably-mounted on said guide; scrapers on the carriage at opposite sides of the belt and turnable from a position parallel with the travel of the belt to a position at an angle thereto; and a frame suspended from the carriage having rollers passing beneath the upper run of the belt, said rollers being normally below and out of contact with the belt and adapted to lift the belt from its roller-support and straighten out transversely the portion of the belt beneath the scrapers; and worm-gearing for adjusting the position of the scrapers relative to the material being conveyed.

10. An unloading mechanism comprising a belt-conveyer and a supporting frame-work, said frame-work having rollers and certain of said rollers being cone-shaped and adapted to uplift the edges of the belt and give to the belt a curved form in cross-section; a guide above the belt, and a carriage movably-mounted on said guide; scrapers on the carriage at opposite sides of the belt and turnable from a position parallel with the travel of the belt to a position at an angle thereto; and a frame suspended from the carriage having rollers passing beneath the upper run of the belt, said rollers being normally below and out of contact with the belt and adapted to lift the belt from its roller-support and straighten out transversely the portion of the belt beneath the scrapers; and means for removably locking the carriage to a fixed portion of the structure.

11. An unloading mechanism having in combination a conveying belt, and a scraper at the side thereof, said scraper being mounted on a vertical axis and adapted to be moved to different angles diagonal to the line of travel of the belt.

In testimony whereof I have hereunto set my hand in presence of two subscribing witnesses.

WILLIAM R. CUNNINGHAM

Witnesses:
SAMUEL E. AUCK,
A. T. CUNNINGHAM.